United States Patent
Borger et al.

(10) Patent No.: US 9,945,980 B2
(45) Date of Patent: *Apr. 17, 2018

(54) SYSTEM, METHOD AND PROGRAM PRODUCT FOR PROVIDING INFRASTRUCTURE CENTRIC WEATHER FORECASTS

(71) Applicant: International Business Machines Corporation, Armonk, NY (US)

(72) Inventors: Sergio Borger, Demarest, NJ (US); Renato Fontoura De Gusmao Cerqueira, Rio de Janeiro (BR); Kiran Mantripragada, Santo Andre (BR); Ulisses T. Mello, Blauvelt, NY (US); Alexandre Pfeifer, Rio de Janeiro (BR); Lucas Correia Villa Real, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/904,101

(22) Filed: May 29, 2013

(65) Prior Publication Data

US 2013/0317749 A1 Nov. 28, 2013

Related U.S. Application Data

(63) Continuation-in-part of application No. 13/251,889, filed on Oct. 3, 2011.

(51) Int. Cl.
*G01W 1/10* (2006.01)

(52) U.S. Cl.
CPC ................................. *G01W 1/10* (2013.01)

(58) Field of Classification Search
CPC ........................................................ G01W 1/10
(Continued)

(56) References Cited

U.S. PATENT DOCUMENTS 7,043,368 B1 * 5/2006 Cote et al. .................. 702/3
7,181,346 B1 * 2/2007 Kleist et al. ................ 702/3
(Continued)

OTHER PUBLICATIONS

C. Jablonowski, Adaptive Grids for Weather and Climate Models, Sep. 6, 2004, University of Michigan.*
(Continued)

*Primary Examiner* — Michael Nghiem
*Assistant Examiner* — Peter Ngo
(74) *Attorney, Agent, or Firm* — Law Office of Charles W. Peterson, Jr.; Louis J. Percello, Esq.

(57) ABSTRACT

A infrastructure sensitivity centric weather forecast system, method of forecasting weather and a computer program product therefor. A forecasting computer applies a grid to a forecast area, locates infrastructure, e.g. power grid infrastructure, in the area and determines weather effects on infrastructure in each grid cell. A targeted selection module iteratively identifies grid cells for refinement in response to the weather effects on cell infrastructure. In each iteration a refined grid is applied to each grid cell identified as containing infrastructure that may be sensitive, or vulnerable, to expected weather. The forecasting computer refines the area considered to focus on area infrastructure and sensitivities/vulnerabilities to expected weather.

9 Claims, 3 Drawing Sheets

(58) Field of Classification Search
USPC .......................................................... 702/3
See application file for complete search history.

(56) References Cited

U.S. PATENT DOCUMENTS

| | | | |
|---|---|---|---|
| 2002/0194113 A1* | 12/2002 | Lof et al. ........................ | 705/37 |
| 2005/0096856 A1* | 5/2005 | Lubkeman et al. ............ | 702/58 |
| 2009/0312943 A1* | 12/2009 | Kelly et al. .................... | 701/204 |
| 2010/0131202 A1* | 5/2010 | Dannevik et al. ............... | 702/3 |
| 2012/0065788 A1* | 3/2012 | Harper et al. ................. | 700/291 |
| 2013/0085673 A1* | 4/2013 | Cavalcante ............. | G01W 1/10 |
| | | | 702/3 |
| 2013/0268196 A1* | 10/2013 | Dam ................................ | 702/3 |

OTHER PUBLICATIONS

Cugnet, Power distribution system, 1997.*

H. Huang et al,, "Geoinformation Computing Platforms", "Advanced GeoInformation Science", Jan. 1, 2010, Publisher: CRC Press.

C. Jablonowski, "Adaptive Mesh Refinement (AMR) for Weather and Climate Models", Jun. 3, 2011, Publisher: http://www-personal.umich.edu/~cjablono/amr.html.

C. Jablonowski, et al,, "Adaptive Grids for Weather and Climate Models", "ECMWF Seminar Proceedings on Recent Developments in Numerical", Sep. 6, 2004, Publisher: ECMWF.

M. Parashar et al., "On Partitioning Dynamic Adaptive Grid Hierarchies", "ICSS", Jan. 2, 1996, pp. 604-613, Publisher: Proceedings of the 29th Annual Hawaii International Conference on System Sciences.

M. Parashar et al., "An Infrastructure for Parallel Adaptive Mesh-Refinement Techniques", Apr. 1, 1995, Publisher: University of Texas at Austin.

B. Plale et al., "CASA and LEAD: Adaptive Cyberinfrastructure for Real-Time Multiscale Weather Forecasting", "IEEE Computer Magazine,", Nov. 1, 2006, Publisher: IEEE.

S. Sinha et al., "Adaptive Runtime Partitioning of AMR Applications on Heterogeneous Clusters," Proceedings of the 3rd IEEE International Conference on Cluster Computing, Oct. 8, 2001.

Constantinescu et al., "Modeling Atmospheric Chemistry and Transport with Dynamic Adaptive Resolution," Computational Geosciences, May 3, 2007.

* cited by examiner

SYSTEM, METHOD AND PROGRAM PRODUCT FOR PROVIDING INFRASTRUCTURE CENTRIC WEATHER FORECASTS

CROSS REFERENCE TO RELATED APPLICATION

The present invention is a continuation in part of published U.S. patent application No. 2013/0085673, Ser. No. 13/251,889, "SYSTEM, METHOD AND PROGRAM PRODUCT FOR PROVIDING POPULACE CENTRIC WEATHER FORECASTS" to Victor Fernandes Cavalcante et al., filed Oct. 3, 2011, assigned to the assignee of the present invention and incorporated herein by reference.

BACKGROUND OF THE INVENTION

Field of the Invention

The present invention is related to providing weather forecasts on wide geographic areas, and more particularly, to tailoring weather forecasts to infrastructure vulnerabilities for a wide geographic area.

Background Description

Typically, weather is forecast from weather data collected from satellite data and from sensors that may be located over a large geographic area or even worldwide. In forecasting the weather for a wide geographic area, the area typically is divided into smaller more manageable units by superimposing a grid over the area. The finer the grid (i.e., smaller cells), the more precise the area forecast. The relationship of the weather data among the several units or grid locations describes the area forecast in several algebraic equations, e.g., using a finite element approach for forecasting weather for the gridded area. Typical finite element approaches or methods (or weather forecasting numerical solvers), are known in the art, for example, as Finite Element Modeling (FEM), Finite Element Analysis (FEA), and Finite Differences Method.

Frequently, the weather model for a very precise forecast requires considerable, even excessive, data processing resources to arrive at a solution. The higher the grid resolution, the larger the number of units, the more complex the model equations and, correspondingly, the more data processing resources consumed in forecasting weather. Thus, data processing demands may make providing real time or even timely forecasts infeasible with any precision for a large area. This becomes especially troublesome when, as is commonly the case, forecast results are subject to tight delivery deadlines. Consequently, a type of targeted mesh refinement, commonly known as adaptive mesh refinement (AMR), has been used to selectively provide real time forecasts.

Adaptive mesh refinement begins with a low resolution grid for an area. The weather map contains coarse-grained cells to provide rough initial forecasts. Where more detailed forecasts are necessary for certain cells, provided there is sufficient data and time available, those cells are further refined. Typical cell refinement is based on quality and quantity of sensors in the area, i.e., the focus is on areas with more and better sensors. Plale et al., "CASA and LEAD: Adaptive Cyberinfrastructure for Real-Time Multiscale Weather Forecasting," *IEEE Computer Magazine,* 2006, provides an example of sensor based refinement.

Unfortunately, weather for an area is a segment of an open, unstable and targeted system and any selected grid may cause a divergent result, i.e., an unsolvable mesh. Each divergent result requires redesigning the grid and solving the resulting FEM. There is no guarantee that the FEM will converge on a solution even on a redesigned grid. However, even when redesigning the grid in sensor based refinement arrives at a solution that weather solution still focuses on refining the grid based on the sensors, i.e. sensor quality and quantity. Thus, the final refined grid still may not conform forecast precision to where actual interests may lie.

State of the art approaches are directed to providing a general forecast for an area that has use to everyone in the area, and are not centered on local infrastructure sensitivities, for example. A typical forecast is made independent of, and oblivious to, local infrastructure sensitivities. State of the art power companies, for example, distribute power over area grids that may include buried as well as areal power lines connected to power stations and substations. All of these power company elements include wires, transformers, fuses, capacitor banks and other assets that are vulnerable, for example, to weather related water damage. Other utilities, such as land and cellular telephone networks, may have the same or similar vulnerabilities.

The typical, sensor-based refinement criteria may either miss areas important to local infrastructure, and include areas that are unimportant to infrastructure concerns. Thus, sensor based refinement may not arrive at an acceptable forecast for infrastructure management. Consequently, using sensor based refinement frequently has required additional work for infrastructure management, e.g., additional solutions directed to missed areas and adding cost.

Thus, there is a need for efficiently providing weather forecasts for large areas targeted for unevenly distributed area infrastructure; and, more particularly for efficiently and quickly arriving at accurate weather forecasts for large areas that are targeted to areas where weather may have the most impact on local utility infrastructure.

SUMMARY OF THE INVENTION

A feature of the invention is infrastructure centered weather forecasts;

Another feature of the invention is local utility infrastructure sensitivity driven grid refinement for forecasting area weather;

Yet another feature of the invention is providing large power distribution area weather forecasts tailored to local power distribution sensitivities and/or vulnerabilities to weather.

The present invention relates to a infrastructure sensitivity centric weather forecast system, method of forecasting weather and a computer program product therefor. A forecasting computer applies a grid to a forecast area, locates infrastructure, e.g. power grid infrastructure, in the area and determines weather effects on infrastructure in each grid cell. A targeted selection module iteratively identifies grid cells for refinement in response to the weather effects on cell infrastructure. In each iteration a refined grid is applied to each grid cell identified as containing infrastructure that may be sensitive, or vulnerable, to expected weather. The forecasting computer refines the area considered to focus on area infrastructure and sensitivities/vulnerabilities to expected weather.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
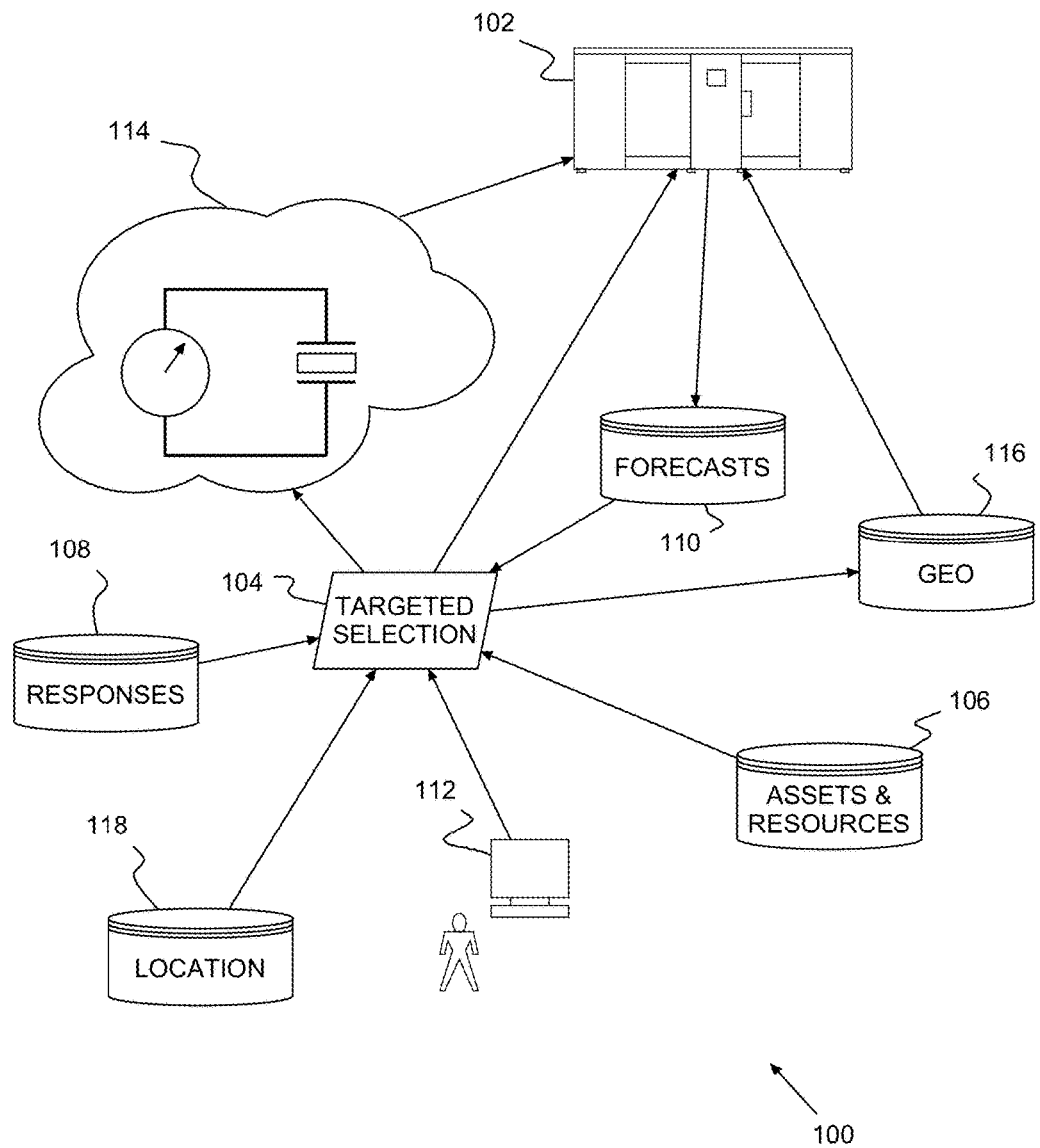
FIG. 1 shows an example of a infrastructure sensitivity centric weather forecasting system according to a preferred embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of an infrastructure sensitivity centric weather forecasting system 100, providing forecasts tailored in this example to power distribution, according to a preferred embodiment of the present invention. A preferred system 100 includes one or more forecasting computers 102, one in this example, iteratively providing weather forecasts based on a refined grid provided by a targeted selection module 104. The targeted selection module 104 may be in or one of the forecasting computers 102. The targeted selection module 104 generates the refined grid from infrastructure asset and resource data 106 in response to process data 108, meteorological (forecast) data 110, real-time data (e.g., power company interaction 112 and local sensor data 114) and geographical data from a Geodatabase 116 and location data 118.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In particular, a preferred system 100 bases cell by cell mesh refinement on area infrastructure to focus weather forecasts in the area on local infrastructure and identify infrastructure sensitivities and vulnerabilities to forecast weather. For power distribution infrastructure, for example, the sensitivities and vulnerabilities may include: the impact on local cell power facilities, cell equipment and power distribution in, through, and associated with, the each refined cell.

High voltage power lines passing through an uninhabited hill region known for frequent mud slides, for example, may be much more vulnerable during torrential downpours than substations located in densely populated cities. Refining the area grid based on the quantity and quality of sensors in a particular cell (or even a populace centric refinement) may very well provide a general forecast for the uninhabited hill region without any specific indication of what, when, where and how the power lines may be vulnerable. A preferred system 100, however, refines the forecast grid by selecting local cell density based on the existence of local infrastructure (e.g., the power grid for the geographical area) and the potential impact that the local weather can have during the forecast period.

So, the preferred targeted selection module 104 uses the available data to iteratively refine the current grid based on the existence of local infrastructure, described by infrastructure asset and resource data 106, that may potentially be sensitive and/or vulnerable to predicted weather 110. In each iteration the preferred targeted selection module 104 refines the grid based on infrastructure asset and resource data 106, and passes each refined grid to the forecasting computer 102 to forecast refined cell weather from meteorological data 110, interactive input 112, local sensor data 114, geographical data 116 and location data 118. As the refined forecast focuses on specific areas with infrastructure potentially vulnerable to imminent weather conditions, the forecast effort diminishes with each iteration. Thus, the data volume considered in each iteration also diminishes. The preferred system 100 rapidly converges on a infrastructure sensitivity centric forecast for the entire forecast area. Moreover, the resulting forecast is tightly tailored to local infrastructure and potential sensitivities and vulnerabilities.

Asset and resource data 106 includes area power grid infrastructure data, e.g., previously provided by local power companies. For example, an area power grid definition may indicate each location of an asset or assets. A typical area power grid may include, for example, power lines and wires, power stations, substations, transformers, fuses, capacitor banks and any other power company assets. A preferred system refines and selects local cells based on the power company infrastructure in the geographical areas enclosed in the resulting cells, infrastructure potentially impacted by inclement area weather.

Response process data 108 includes activity plans to avoid damages and may including previous planned field operations. Forecast data 110 includes current and previous forecasts provided by forecast system 102. Preferably, the forecast system 102 generates an area-wide forecast 110 similar to, and may further forecast area weather as described by, Cavalcante et al., U.S. patent application No. 2013/0085673, Ser. No. 13/251,889, "SYSTEM, METHOD AND PROGRAM PRODUCT FOR PROVIDING POPULACE CENTRIC WEATHER FORECASTS," filed Oct. 3, 2011, assigned to the assignee of the present invention and incorporated herein by reference. The area-wide forecast may be refined for or further refined for infrastructure with potential vulnerability to forecast inclement weather as further described hereinbelow.

Real-time data 112, 114 may include data provided from power companies/electrical distribution companies. For example, location data 112 may include the location of each asset, as well as how critical each asset is to the whole distribution grid, a severity associated with loss of the asset, costs to recover the lost asset, activity plans to avoid damages including previously implemented field operations, and the number of people that may be affected by losing the particular asset.

So, for example, local power companies may indicate or update interactively 112: the current criticality of each asset to the whole distribution grid; the severity of damage from losing a particular asset; recovery costs; the potential portion of the population that may be affected; and/or anything else deemed pertinent to grid under present, ongoing or imminent weather conditions. The real-time sensor data 114 may include weather sensor information, such as wind gust, severe rain, regular rain, snowstorms, thunder storms, specific humidity conditions, taken, for example, from weather satellites, rain gauges, weather sensors, weather radar and any other suitable weather collecting sensors. The Geodatabase 116 holds high, mid and low resolution maps of the terrain related to the areas covered by the forecast system 102. Location data 118 characterizes local events that may affect responses or response times, such as traffic jams, floods, mudslides, hurricanes, accidents and other incidents reported by agencies and citizens to control centers.

Each data collection 106, 108, 110, 116, 118 may be maintained current, for example, receiving updates by subscription to a Really Simple Syndication (RSS) event distribution service. Alternately, a computer storing each particular data collection 106, 108, 112, 116, 118 may periodically request updates for stored data.

The targeted selection module 104 examines the asset and resource data 106 in each forecast cell, winnowing the area considered in each iteration until minimum cell resolution for the final forecast iteration. Essentially, this winnowing begins with a coarse grid and identifying empty cells (i.e., no infrastructure) or risk free cells with good weather, balmy or storm-free weather, and therefore, posing no risk regardless of area infrastructure. The targeted selection module 104 marks identified empty, risk free cells as complete and removes them from further consideration.

In each subsequent iteration the targeted selection module 104 grids remaining cells with a finer grid (smaller cells). The targeted selection module 104 marks refined cells as complete where cell weather conditions and/or cell area power grid infrastructure do not warrant further consideration, e.g., fair weather or non-critical equipment. Marking those smaller, refined cell areas removes them from further consideration to shrink the forecast area for subsequent iterations. Each remaining cell encloses an area with conditions that prevent marking the area forecast as complete, and the targeted selection module 104 generates a tighter grid for that cell area. So, in each iteration only the remaining cell areas are considered for refining to provide a targeted, yet more comprehensive forecast. Thus for each iteration, the targeted selection module 104 generates a tighter grid with a higher resolution map for each of the remaining cells. The targeted selection module 104 passes the new grid to the forecast computer 102. The forecast computer 102 uses the tighter grid such area to refine the forecast, projecting more precise weather effects for those cells during the forecast period, e.g., cells likely to experience mudslides.

It should be noted that asset and resource data 106, response process data 108, forecast data 110, Geodatabase 116 and location data 118 may be separately collected and maintained in individual computers or PCs or in a single computer or server, e.g., a forecasting computer 102. Also, any one or more of the data sources 106, 108, 110, 112, 114, 116, 118 may be contained in a single storage on a single computer, supported by a single computer or distributed in multiple such locations on separate individual computers, e.g., in what is known as the cloud. Further, power company data and sensor data 114 may be stored as historic data, e.g., 118, as it is provided directly to the forecast computer 102 and a Targeted Selector (e.g., targeted selection module 104).

Figure 2:
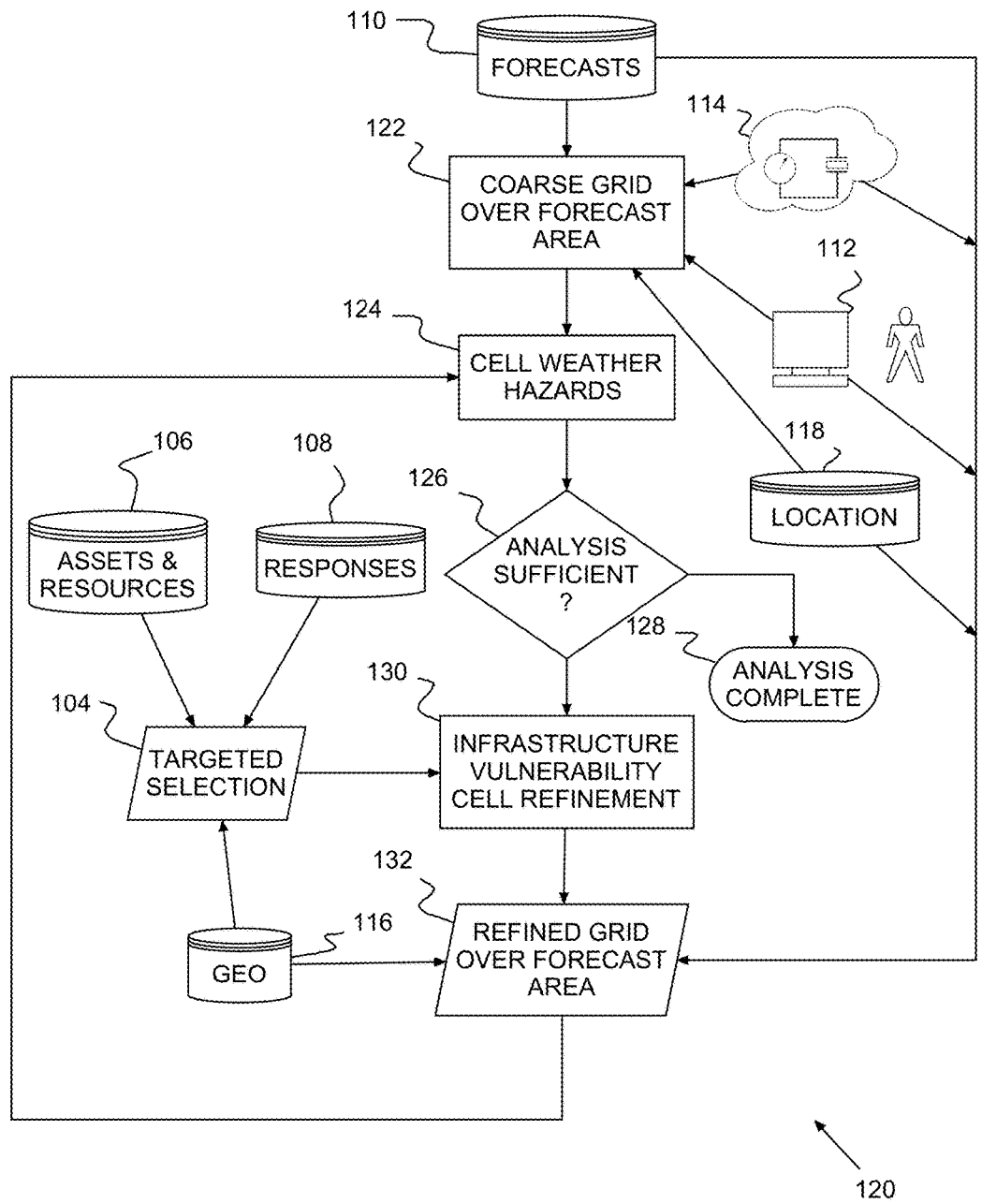
FIG. 2 shows an example of providing infrastructure vulnerability or sensitivity centric weather forecasts according to an embodiment of the present invention.

FIG. 2 shows a more detailed data flow 120 example of providing infrastructure vulnerability or sensitivity centric weather forecasts according to a preferred embodiment of the present invention, e.g., by the system 100 of FIG. 1, with like features labeled identically. Initially the forecasting computer 102 applies a coarse grid 122 to obtain a quick area-wide forecast 110 with current local data 112, 114, 118. Then, simulating 124 the area response to the weather forecast identifies cell weather hazards 126, e.g., identifies cells with some local flooding, likely tornado activity, or torrential downpours.

Then, in the first iteration and each subsequent iteration, the targeted selection module 104 checks 126 whether analysis is completed by the current iteration. For example, in the first iteration clear skies for the entire forecast area would result in all grids checked and completed analysis 128. So, the targeted selection module 104 checks 126 the current gridded area simulation to identify completed area cells, and determine whether any local hazards are in cells with potentially vulnerable infrastructure 106. The targeted selection module 104 marks complete any cell that does not include both potentially vulnerable infrastructure 106 and one or more local hazards, and eliminates complete cells from further consideration. So for example, in each iteration the targeted selection module 104 marks cells with no infrastructure 106 or enclosing clear sky areas as completed. Analysis is complete 128 when the current grid is at a minimum resolution or all cells are marked complete, i.e., no forecast area cells include both potentially vulnerable infrastructure 106 and local hazards.

If, however, the targeted selection module 104 finds 126 one or more cells enclosing both potentially vulnerable infrastructure 106 and local hazards, further analysis and refinement 130 is necessary/possible for any remaining cells. The targeted selection module 104 provides a refined grid 130 for application to the area in those remaining cells, i.e., for locally better forecast resolution in those cells. The forecast system 102 superimposes 132 the refined grid on the area in the remaining cells. The forecast system 102 assesses which remaining areas may face, or be historically registered to face, weather conditions that can affect local infrastructure (e.g., local power plants) from historic and current local data 112, 114, 118.

So, in the next iteration, the forecast system 102 simulates 126 local hazards only for area enclosed by refined cells. Again, the targeted selection module 104 checks each refined cell in the gridded area, marking those cells complete that do not include both potentially vulnerable infrastructure 106 and one or more local hazards; and, eliminating completed cells from further consideration. If the targeted selection module 104 marks all refined cells complete, the analysis is sufficient 126 and complete 128. Otherwise, the forecast system 102 continues using increasingly refined granularity 130 (smaller cells) from the targeted selection module 104 for increasingly smaller areas to arrive 128, iteratively, at an acceptable 126 description targeted to infrastructure vulnerabilities.

So, for a given wide area 122, e.g., a continent or a country, an initial N by M coarse grid is selected, either manually, arbitrarily selecting integer values for N and M or, by default. The values of N and M are unimportant, other than to provide a starting point for the first iteration. Typically, however, N and M are selected such that the cells are square and the product (N×M) is at least equal to the number of forecasting computers 102 or processor cores. Preferably, N and M are selected or set initially, such that at that coarse resolution, the system 100 quickly delivers 126 a forecast 110 that lacks very rich details.

The forecast system 102 provides the first, quick forecast 110 using the N by M coarse grid superimposed on mid or low resolution map(s), e.g., an area map at the lowest available resolution from geodatabase 116, in combination with the meteorological sensor data 114. Preferably, the forecast system 102 forecasts cell weather and simulates hazards using a numerical model solver, e.g., a model based on computer fluid dynamics. The Weather Research and Forecasting (WRF) model is an example of forecasting weather based on computer fluid dynamics. See, e.g., IBM's Deep Thunder www.research.ibm.com/weather/DT.html for one such WRF model.

Then, the forecast system 102 passes the area response simulation 124 to the targeted selection module 104, which adds infrastructure to the area information. Alternately, the forecast system 102 may add infrastructure to the area information before passing it to the targeted selection module 104. The targeted selection module 104 marks empty coarse cells complete, and marks coarse cells with favorable or mild weather complete. The coarse-resolution analysis is sufficient 126 for areas in the marked cell(s). The remaining, unmarked coarse cells have infrastructure with a potential vulnerability during the forecast period that requires further detailed analysis. For example, unmarked cells may enclose infrastructure in the path of rainstorms, tornados or hurricanes, or other events, scheduled or otherwise. Also, some unmarked cells may have a history of fires during drought or landslides during rain that may destroy power lines or make servicing downed power lines difficult or impossible. In any iteration, when all of the cells are found and marked as complete 126, additional action is unnecessary; and, the targeted selection module 104 notifies the forecast system 102 that the forecast is complete 128.

Alternately, the targeted selection module 104 may use asset and resource data 106, response process data 108 and location data 112 to weight variables in deciding about vulnerabilities and whether additional refinement of any cell is needed or not. For example, aerial power lines may be considered more vulnerable and so, weighted higher than buried power lines. The decision for further refinement may be automatic, e.g., if the weighted response exceeds a threshold, or manual in response to input from a human, e.g., 112.

Until all cells are marked complete 128, however, some cells remain that enclose vulnerable infrastructure in inclement weather areas, e.g., power stations in flood plains or tornado corridors passing through and intersecting high voltage power line. The targeted selection module 104 selects an I by K grid, where I and K also are arbitrarily selected integers, for a higher resolution forecast for the remaining areas.

The targeted selection module 104 passes the higher resolution, refined grid 132 to the forecast system 102, which begins the next iteration 124. In this and each subsequent iteration, the forecast system 102 applies the refined grid to higher resolution local maps from geodatabase 116 to simulate weather and more precisely locate hazards in those previously unmarked cells. Then, the forecast system 102 generates a forecast and simulates weather 124 for each refined grid cell based on available information in asset and resource data 106, response process data 108, forecast data 110, location data 112 and real-time sensor data 114.

With each new refined simulation 124, the targeted selection module 104 further reduces the area being considered and simulated by marking complete any refined cells with no hazards or no infrastructure. If after marking there are unmarked cells, those cells are further refined 130 in the next iteration using the next highest map resolution. Refining the grid and simulating 124 continues until the targeted selection module 104 finds an unchanged, identified final resolution or until the forecast is provided for the highest resolution map for an unmarked area and no further refinement is available. At that point the remaining cells are marked complete 126. After all of the cells are marked complete 126, additional action is unnecessary and the forecast is complete 128.

Figure 3:
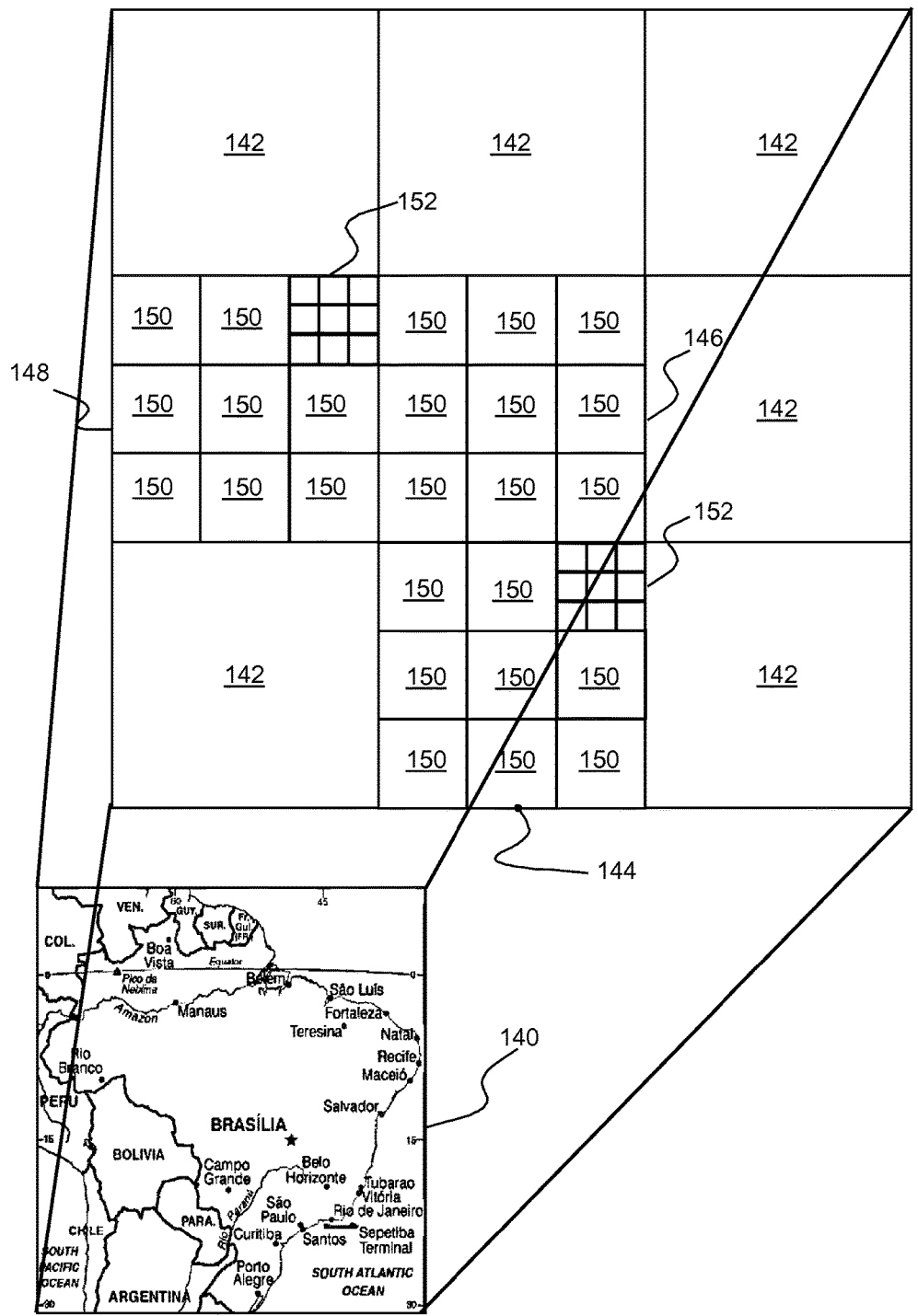
FIG. 3 shows a simple example of refining a forecast for a wide area, wherein grid refinement is infrastructure centric for local analysis and forecasting.

FIG. 3 shows a simple example of refining a forecast for a wide area 140, wherein for local analysis and forecasting, grid refinement is infrastructure sensitivity centric according to a preferred embodiment of the present invention; and with further reference to the system 100 of FIG. 1 and method 120 of FIG. 2. In the initial iteration a three by three (3×3) square cell grid is overlaid 122 on wide area 140. After the initial simulation 124, subsequent iterations grid selection is infrastructure sensitivity centric.

In this example, the targeted selection module 104 begins by selecting one cell and gathers infrastructure 106 and response process data 108 for the area contained in the selected cell. If the infrastructure analysis indicates the cell is clear or has otherwise stable weather during the forecast time, for example, that cell 142 is marked complete. Otherwise the simulation may indicate forthcoming hazards, for example, flooding in unmarked cells that contain vulnerable infrastructure. The targeted selection module 104 determines areas that need further examination and refines the grid only for those areas.

So after the coarse forecast in this example, six (6) cells 142 are marked complete, e.g., areas that are free of infrastructure and that may even be experiencing heavy rain or areas with infrastructure, but clear, balmy weather. The remaining three (3) cells 144, 146, 148 contain inclement weather and significant infrastructure. The targeted selection module 104 marks all but those 3 cells 144, 146, 148, which remain unmarked for a more comprehensive forecast.

With each iteration, the targeted selection module 104 can prioritize unmarked areas by weighting information from static data (e.g., fixed infrastructure and associated characteristics) and targeted data (e.g., power company input) to grid the areas and forecast weather for increasingly smaller geographic regions. For example, the targeted selection module 104 can identify and give higher priority to coarse cells with storm activity in populated areas, where loss of power can exacerbate other problems. With each iteration the analysis is complete for more area, as areas where the weather is likely to have little impact or, where a higher resolution forecast is unavailable, are marked complete. Some marked areas may even have significant weather, for example, storms that are in areas where infrastructure is unlikely to be unaffected.

After the first iteration the targeted selection module 104 generates a set of sub-regions only for each unmarked cell, i.e., a locally higher resolution grid. So, a smaller 3×3 grid is applied to cells 144, 146, 148. The refined grid is returned to the forecast system 102 for refining 126 the forecast 110 for the area of cells 144, 146, 148 with better confidence. After this second iteration, refined grid cells 150 in cell 146 are marked complete. Thus, cell 146 is also complete because each cell 150 in cell 146 either lacks significant infrastructure where weather is inclement or, because the local forecast shows fair weather in cells 150 regardless of infrastructure.

Only 2 of the refined grid cells 152 remain unmarked after the refined forecast 110 of the second iteration. These remaining cells 152, most likely, have local infrastructure vulnerabilities with heavy weather or have scheduled events or a history of weather events even in moderate weather (e.g., frequent mud slides), where infrastructure damage may have a bigger impact during those scheduled events. Alternately, the targeted selection module 104 may simultaneously locate potentially vulnerable infrastructure in all unmarked cells and grid those cells first in a refinement 132. In the next and final iteration of this example, the targeted selection module 104 applies a still smaller 3×3 grid to cells 152. Then, the forecast system 102 retrieves the next highest resolution map from geodatabase 116 and applies the refined grid 134 to the higher resolution map and includes infrastructure resources and assets 106. The forecast system 102 uses this highest resolution grid and map to refine the simulation 124 for those cells 152 to complete the infrastructure sensitivity centric forecast.

A preferred system 100 can use all those information for various local areas to trigger a nested and fine grain resolution simulation 124 for that/those areas. Unlike prior methods that rely solely on static information or on cloud formation locations, the preferred populace centric forecast system 100 provides weather forecasts, tailored to infrastructure targeted for potential vulnerabilities. These infrastructure sensitivity centric forecasts efficiently leverage system facilities, selectively providing high resolution results only as, and where, necessary; while otherwise minimizing resources that might otherwise be used in providing forecasts to areas determined to be less critical or less important. Thus, a preferred system 100 optimizes computing resource consumption for greener data centers and to insure considering the targeted characteristics of regional and local power infrastructure vulnerabilities.

Thus advantageously, a preferred system 100 provides a very localized and targeted, but robust, forecast by considering all available information. In particular, a preferred system 100 performs mesh refinement for numerical weather (atmospheric) models based on the potential impact on distributed, even sparsely distributed, infrastructure such as power grids. Such power grid infrastructure may include, for example, power lines, full stations, substations, wires, transformers, fuses, capacitor banks and any other power company assets.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of forecasting weather, said method comprising:

positioning at least one weather sensor with power company assets comprising power lines and wires, power stations, substations, transformers, fuses, and capacitor banks in a forecast area;

indicating vulnerabilities of said power company assets;

receiving weather data from a plurality of weather sensors sensing weather in a forecast area, wherein said plurality of weather sensors include weather satellites, rain gauges, weather radar and said at least one weather sensor;

overlaying an initial grid on said forecast area, said initial grid segmenting said forecast area into cells, the gridded forecast area being provided to a forecast computer for iteratively forecasting weather during a forecast period for said forecast area responsive to received said weather data;

forecasting weather for said gridded forecast area in a current iteration;

marking complete each cell either not enclosing area infrastructure or with weather inactivity, such that only grid cells with weather activity and that enclose infrastructure vulnerable to that forecast weather activity are not marked complete, enclosed said infrastructure including said at least one weather sensor, wherein said enclosed infrastructure includes said power company assets for said forecast area;

determining if all cells are marked complete;

providing a refined grid for every cell not marked complete;

overlaying said refined grid on forecast area in each cell not marked complete, said refined grid further segmenting said forecast area into smaller, refined grid cells;

returning to forecasting weather in a next iteration and marking complete refined grid cells either not enclosing vulnerable said area infrastructure or with weather inactivity;

providing a final weather map to a display;

displaying said final weather map with weather displayed at the finest resolution in inclement weather affected areas with identified said vulnerable infrastructure, wherein post map resolution enhancement is not required at said vulnerable infrastructure such that data processing resource consumption is minimized in generating an infrastructure focused forecast reflected in said final weather map; and when a current criticality changes updating said vulnerabilities of said power company assets and returning to receiving said weather data from said plurality of weather sensors.

2. The method as in claim 1, wherein when all cells are marked complete, the weather forecast for said forecast area is complete.

3. The method as in claim 1, wherein marking cells and refined grid cells complete comprises:

receiving area data for each cell from area data sources;

simulating weather effects during a forecast period for the area enclosed in each cell responsive to received said area data and said received weather data;

locating infrastructure in said forecast area; and identifying any located said infrastructure vulnerable to simulated said weather effects.

4. The method as in claim 3, wherein said area data includes historical data, and projected data.

5. The method as in claim 3, wherein said area data includes power company asset and resource data, response process data, historical incident data, and geodata.

6. The method as in claim 1, wherein said at least one local said weather sensor comprises local sensors sensing wind gusts, storm, and humidity conditions.

7. The method as in claim 1, wherein overlaying said initial grid on said forecast area comprises overlaying said initial grid on a map of said forecast area having a first resolution in a first iteration, said refined grid being overlaid on a higher resolution map of said respective cell area in subsequent iterations.

8. The method as in claim 7, wherein cells are further marked complete whenever a forecast has been provided for said respective forecast area with said refined grid overlaid on the highest resolution map.

9. The method as in claim 1, wherein indicating and updating said vulnerabilities of said power company assets provides at least one of:

a current asset criticality for assets across the whole distribution grid;

the severity of damage from losing a particular asset;

recovery costs; and a potential portion of affected population.

* * * * *